United States Patent
Nii et al.

(10) Patent No.: US 10,287,394 B2
(45) Date of Patent: May 14, 2019

(54) INJECTION-MOLDED BODY FOR VEHICLE, AUTOMOBILE LIGHT GUIDE USING SAME, AUTOMOBILE INTERIOR PANEL, AND AUTOMOBILE LAMP LENS

(71) Applicant: MITSUBISHI GAS CHEMICAL COMPANY, INC., Tokyo (JP)

(72) Inventors: Yuusuke Nii, Ibaraki (JP); Noriyoshi Ogawa, Ibaraki (JP)

(73) Assignee: MITSUBUSHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/550,227

(22) PCT Filed: Mar. 28, 2016

(86) PCT No.: PCT/JP2016/059872
§ 371 (c)(1),
(2) Date: Aug. 10, 2017

(87) PCT Pub. No.: WO2016/158843
PCT Pub. Date: Oct. 6, 2016

(65) Prior Publication Data
US 2018/0079861 A1    Mar. 22, 2018

(30) Foreign Application Priority Data
Mar. 31, 2015    (JP) ................ 2015-072685

(51) Int. Cl.
| | |
|---|---|
| C08G 64/00 | (2006.01) |
| C08G 64/06 | (2006.01) |
| B29C 45/00 | (2006.01) |
| C08J 5/00 | (2006.01) |
| C08G 64/14 | (2006.01) |
| B29K 69/00 | (2006.01) |
| B29L 11/00 | (2006.01) |
| B29L 31/30 | (2006.01) |

(52) U.S. Cl.
CPC .............. *C08G 64/06* (2013.01); *B29C 45/00* (2013.01); *B29C 45/0001* (2013.01); *C08G 64/14* (2013.01); *C08J 5/00* (2013.01); *B29K 2069/00* (2013.01); *B29L 2011/0016* (2013.01); *B29L 2031/3005* (2013.01)

(58) Field of Classification Search
USPC ................................................. 528/196, 198
See application file for complete search history.

(56) References Cited

U.S. PATENT DOCUMENTS

2009/0304977 A1    12/2009 Kanagawa et al.

FOREIGN PATENT DOCUMENTS

| | | |
|---|---|---|
| JP | 61-116962 | 1/1986 |
| JP | 11-300842 | 11/1999 |
| JP | 11-306823 | 11/1999 |
| JP | 2000-153535 | 6/2000 |
| JP | 2002-161202 | 6/2002 |
| JP | 2003-096180 | 4/2003 |
| JP | 2003-137998 | 5/2003 |
| JP | 2004-314422 | 11/2004 |
| JP | 3758951 | 3/2006 |
| JP | 4156162 | 9/2008 |
| JP | 2013-147588 | 8/2013 |
| WO | 03/029324 | 4/2003 |
| WO | 2007/132874 | 9/2009 |

OTHER PUBLICATIONS

International Search Report issued in Patent Application No. PCT/JP2016/059872, dated Apr. 19, 2016.
Ming Chan Yang et al., "Modern Engineering Plastic Modification.".

*Primary Examiner* — Terressa Boykin
(74) *Attorney, Agent, or Firm* — Greenblum & Bernstein, P.L.C.

(57) ABSTRACT

The present invention can provide an injection-molded body for a vehicle, the injection-molded body having a terminal structure that is indicated by general formula (1) and containing a polycarbonate resin that has a viscosity-average molecular weight of 18,000-24,000.

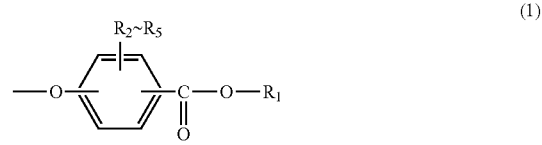

(1)

10 Claims, No Drawings

INJECTION-MOLDED BODY FOR VEHICLE, AUTOMOBILE LIGHT GUIDE USING SAME, AUTOMOBILE INTERIOR PANEL, AND AUTOMOBILE LAMP LENS

TECHNICAL FIELD

The present invention relates to an injection-molded body for vehicles containing a polycarbonate resin.

BACKGROUND ART

Recently, in Europe, North America, etc., the use of automobile lights during daytime has been promoted for the purpose of improving visibility from pedestrians and oncoming vehicles in the daytime. A day lamp is usually placed near a head lamp and a rear lamp. For this reason, the structure around lamps is complicated, and it is constructed with members having a fine structure such as a light guide. Moreover, due to the use of automobile lights during daytime, the quantity of heat generated from light sources of lamps is increased, and heat resistance of peripheral members is required. Furthermore, lamps with wide irradiation ranges are desired, and increase in luminance and size of light lenses is desired.

Meanwhile, importance is placed on reduction in weight of automobiles from an environmental perspective. For this reason, it is extremely important to realize reduction in thickness and weight and improvement of impact resistance and strength of not only the above-described lamps, but also exterior and interior members of automobiles.

In general, when producing a large-sized/thin-type molded body by the injection molding method using a thermoplastic resin, it is required to improve the flowability of the resin in order to provide high transferability. For this reason, the viscosity-average molecular weight of the resin is often reduced. However, when the molecular weight of the resin is too small, the strength of the molded body is insufficient and cracking of the molded body is easily caused at the time of mold release. Thus, the improvement of the flowability of the resin by reduction in molecular weight is limited.

Among thermoplastic resins obtained from the same structural unit, there is a tendency that the lower the glass transition temperature (Tg) is, the more excellent the flowability and transferability of a molded body obtained are. However, when Tg is too low, it is impossible to obtain an injection-molded body having excellent heat resistance. For example, conventional polycarbonate resin obtained by reacting 2,2-bis(4-hydroxyphenyl)propane (common name: bisphenol A, hereinafter abbreviated as BPA) with phosgene or carbonic acid diester (common name: BPA-PC, hereinafter abbreviated as BPA-PC) has excellent heat resistance and transparency and also has excellent mechanical properties such as impact resistance, and therefore is widely utilized not only as a structural material, but also as an optical material for a light guide plate for liquid crystal, an optical disk substrate, various types of lenses, a prism, an optical fiber, etc.

However, recently, with the extension of intended use as optical materials, impact resistance of BPA-PC may be insufficient, and for this reason, it is strongly desired to develop a large-sized/thin-type injection-molded body for vehicles having improved impact resistance.

PRIOR ART DOCUMENTS

Patent Documents

Patent Document 1: Japanese Laid-Open Patent Publication No. H11-300842

Patent Document 2: Japanese Laid-Open Patent Publication No. 2000-153535

Patent Document 3: International Publication WO2007/132874 pamphlet

Patent Document 4: Japanese Patent No. 4156162

Patent Document 5: Japanese Patent No. 3758951

SUMMARY OF THE INVENTION

Problems to be Solved by the Invention

In order to solve the above-described problems, for example, Patent Documents 1-3 disclose an optical disk substrate obtained by using a polycarbonate resin suitable for injection molding, wherein the main skeleton is still a bisphenol A type but the type of an end terminator is changed. However, Patent Documents 1-3 do not describe any member for vehicles such as a light guide obtained by using a polycarbonate resin, and in addition, resins described in these documents may not have sufficient impact resistance to be used as large-sized molded bodies.

Patent Document 4 suggests a light guide plate obtained by using a polycarbonate resin having a long-chain alkyl group as an end group and having improved flowability. However, it is desired to further improve flowability for increasing in size, and in addition, there is a room for improvement of impact resistance.

Patent Document 5 suggests a substrate for optical information recording media, wherein heat discoloration resistance thereof is improved by using a polycarbonate resin having a long-chain alkyl group as an end group. However, as a molded body for vehicles, there is a room for further improvement of impact resistance and transferability.

The problem to be solved by the present invention is to provide an injection-molded body for vehicles, which contains a polycarbonate resin and is excellent in heat resistance and impact resistance.

Means for Solving the Problems

The present inventors diligently made researches and found that an injection-molded body for vehicles, which contains a polycarbonate resin having a specific terminal structure and a specific viscosity-average molecular weight, is excellent in heat resistance and impact resistance compared to a molded body made of conventional polycarbonate resin and can become a molded body having a fine structure, and thus the present invention was achieved.

Specifically, the present invention relates to an injection-molded body for vehicles containing a polycarbonate resin as follows:

<1> An injection-molded body for vehicles, comprising a polycarbonate resin having a terminal structure represented by general formula (1) and having a viscosity-average molecular weight of 18,000 to 24,000:

(1)

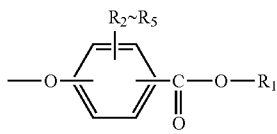

wherein:

$R_1$ represents an alkyl group having 5 to 23 carbon atoms or an alkenyl group having 8 to 36 carbon atoms; and $R_2$ to $R_5$ each independently represent any one selected from the group consisting of hydrogen, halogen, an alkyl group having 1 to 20 carbon atoms which may have a substituent and an aryl group having 6 to 12 carbon atoms which may have a substituent.

<2> The molded body according to item <1>, wherein the polycarbonate resin comprises a structural unit represented by general formula (2):

(2)

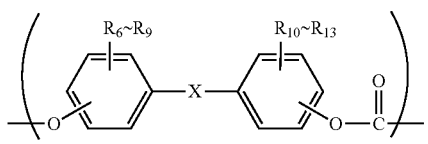

wherein:

$R_6$ to $R_{13}$ each independently represent any one selected from the group consisting of hydrogen, halogen, an alkoxyl group having 1 to 5 carbon atoms which may have a substituent, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent and an alkenyl group having 2 to 15 carbon atoms which may have a substituent; and X represents any structure selected from the group consisting of a single bond, —O—, —S—, —SO—, —SO$_2$—, —CO— and general formulae (3) to (6) below:

(3)

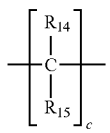

wherein:

$R_{14}$ and $R_{15}$ each independently represent any one selected from the group consisting of hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an alkenyl group having 2 to 5 carbon atoms which may have a substituent and an aralkyl group having 7 to 17 carbon atoms which may have a substituent; and c represents an integer of 1 to 20, (4)

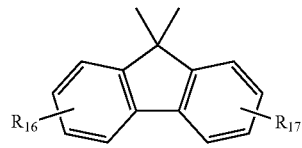

wherein $R_{16}$ and $R_{17}$ each independently represent any one selected from the group consisting of hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an alkenyl group having 2 to 5 carbon atoms which may have a substituent and an aralkyl group having 7 to 17 carbon atoms which may have a substituent, and $R_{16}$ and $R_{17}$ may be bonded together to form a carbocyclic ring or heterocyclic ring having 1 to 20 carbon atoms, (5)

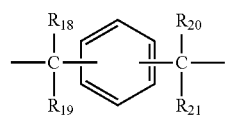

wherein $R_{18}$ to $R_{21}$ each independently represent any one selected from the group consisting of hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an alkenyl group having 2 to 5 carbon atoms which may have a substituent and an aralkyl group having 7 to 17 carbon atoms which may have a substituent, and $R_{18}$ and $R_{19}$, and $R_{20}$ and $R_{21}$, respectively, may be bonded together to form a carbocyclic ring or heterocyclic ring having 1 to 20 carbon atoms, (6)

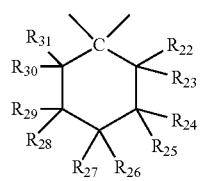

wherein $R_{22}$ to $R_{31}$ each independently represent a hydrogen atom or an alkyl group having 1 to 3 carbon atoms.

<3> The molded body according to item <1> or <2>, wherein the terminal structure has a structure represented by general formula (8):

(8)

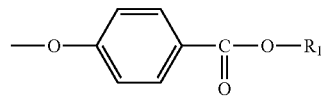

wherein $R_1$ represents an alkyl group having 5 to 23 carbon atoms.

<4> The molded body according to item <3>, wherein $R_1$ in general formula (8) is at least one selected from the group consisting of a 2-ethylhexyl group, a 2-hexyldecyl group, a hexadecyl group and a docosyl group.
<5> The molded body according to any one of items <2> to <4>, wherein X in general formula (2) has a structure of general formula (3).
<6> The molded body according to any one of items <1> to <5>, wherein the polycarbonate resin has a Q value of $10 \times 10^{-2}$ cc/sec or more.
<7> The molded body according to any one of items <1> to <6>, wherein the polycarbonate resin has an Izod impact strength of 200 J/m or more.
<8> The molded body according to any one of items <1> to <7>, wherein the polycarbonate resin has a glass transition temperature of 105° C. or higher.
<9> An automobile light guide, which comprises the molded body according to any one of items <1> to <8> as a member.
<10> An automobile interior panel, which comprises the molded body according to any one of items <1> to <8> as a member.
<11> An automobile lamp lens, which comprises the molded body according to any one of items <1> to <8> as a member.

Advantageous Effect of the Invention

The injection-molded body for vehicles of the present invention is excellent in heat resistance and impact resistance compared to conventional molded bodies and can easily become a molded body having a fine structure. Moreover, in the case of the molded body of the present invention, characteristics required for various molded bodies for vehicles (e.g., impact resistance, transferability, heat resistance, transparency and color phase) can be retained while maintaining inherent characteristics of polycarbonate resin.

DESCRIPTION OF THE EMBODIMENTS

Hereinafter, one example of the embodiment of the present invention will be described, but the present invention is not limited to the below-described embodiment.
[Injection-Molded Body for Vehicles]
The injection-molded body for vehicles of the present invention contains a polycarbonate resin having a specific structure and a specific viscosity-average molecular weight. Hereinafter, the polycarbonate resin will be described.
[Polycarbonate Resin]
The polycarbonate resin contained in the injection-molded body for vehicles of the present invention has a terminal structure represented by general formula (1) below and has a viscosity-average molecular weight of 18,000 to 24,000:

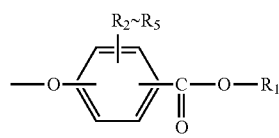

(1)

In general formula (1), $R_1$ represents an alkyl group having 5 to 23 carbon atoms or an alkenyl group having 8 to 36 carbon atoms. $R_2$ to $R_5$ each independently represent any one selected from the group consisting of hydrogen, halogen, an alkyl group having 1 to 20 carbon atoms which may have a substituent and an aryl group having 6 to 12 carbon atoms which may have a substituent. In this regard, the above-described substituents are each independently halogen, an alkyl group having 1 to 20 carbon atoms or an aryl group having 6 to 12 carbon atoms.

Further, the terminal structure represented by general formula (1) is more preferably a terminal structure represented by general formula (8):

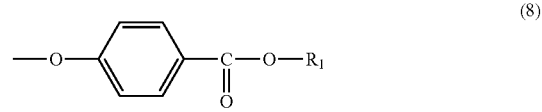

(8)

In general formula (8), $R_1$ represents an alkyl group having 5 to 23 carbon atoms. $R_1$ is an alkyl group having more preferably 6 to 22 carbon atoms, even more preferably 6 to 20 carbon atoms, and particularly preferably 8 to 16 carbon atoms. Specifically, $R_1$ is preferably at least one selected from the group consisting of a 2-ethylhexyl group, a 2-hexyldecyl group, a hexadecyl group and a docosyl group.

The polycarbonate resin is obtained by performing polymerization using a dihydroxy compound and a carbonate-ester-forming compound and terminating the reaction using an end terminator represented by general formula (1a):

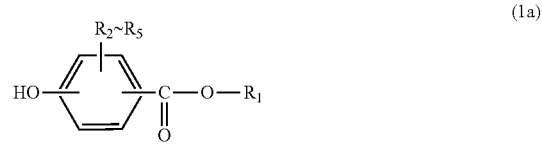

(1a)

Hereinafter, respective raw materials of the polycarbonate resin will be described in detail.
<Dihydroxy Compound>
The dihydroxy compound to be used for the polycarbonate resin contained in the injection-molded body for vehicles of the present invention is not particularly limited as long as it is a phenol-based compound having two hydroxyl groups in the molecule, but from the viewpoint of impact resistance of a molded body obtained, high purity and a large distribution amount, it is preferably a dihydric phenol represented by general formula (7). When using the dihydric phenol, the obtained polycarbonate resin has a structural unit represented by general formula (2).

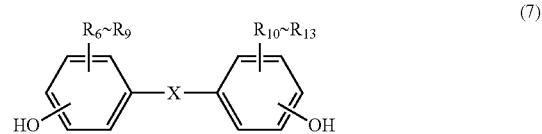

(7)

In general formula (7): $R_6$ to $R_{13}$ each independently represent any one selected from the group consisting of hydrogen, halogen, an alkoxyl group having 1 to 5 carbon atoms which may have a substituent, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent and an alkenyl group having 2 to 15 carbon atoms which may have a substituent; and X represents any structure selected from the group consisting of a single bond, —O—, —S—, —SO—, —SO$_2$—, —CO— and general formulae (3) to (6) below.

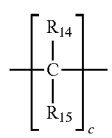

(3)

In general formula (3), $R_{14}$ and $R_{15}$ each independently represent: hydrogen; halogen; an alkyl group having 1 to 20, preferably 1 to 8, more preferably 1 to 3 carbon atoms which may have a substituent; an alkoxy group having 1 to 5, preferably 1 to 3 carbon atoms which may have a substituent; an aryl group having 6 to 12, preferably 6 to 8 carbon atoms which may have a substituent; an aralkyl group having 7 to 17, preferably 7 to 12 carbon atoms which may have a substituent; or an alkenyl group having 2 to 15, preferably 2 to 5 carbon atoms which may have a substituent. In this regard, the above-described substituents are each independently halogen, an alkyl group having 1 to 20 carbon atoms or an aryl group having 6 to 12 carbon atoms. c represents an integer of 1 to 20, preferably 1 to 12, and more preferably 1.

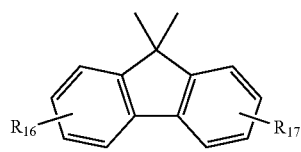

(4)

In general formula (4), $R_{16}$ and $R_{17}$ each independently represent: hydrogen; halogen; an alkyl group having 1 to 20, preferably 1 to 9 carbon atoms which may have a substituent; an alkoxy group having 1 to 5, preferably 1 to 3 carbon atoms which may have a substituent; an aryl group having 6 to 12, preferably 6 to 8 carbon atoms which may have a substituent; an aralkyl group having 7 to 17, preferably 7 to 12 carbon atoms which may have a substituent; or an alkenyl group having 2 to 15, preferably 2 to 5 carbon atoms which may have a substituent. In this regard, the above-described substituents are each independently halogen, an alkyl group having 1 to 20 carbon atoms or an aryl group having 6 to 12 carbon atoms. $R_{16}$ and $R_{17}$ may be bonded together to form a carbocyclic ring or heterocyclic ring having 1 to 20, preferably 1 to 12 carbon atoms.

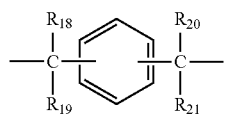

(5)

In general formula (5), $R_{18}$ to $R_{21}$ each independently represent: hydrogen; halogen; an alkyl group having 1 to 20, preferably 1 to 9 carbon atoms which may have a substituent; an alkoxy group having 1 to 5, preferably 1 to 3 carbon atoms which may have a substituent; an aryl group having 6 to 12, preferably 6 to 8 carbon atoms which may have a substituent; an aralkyl group having 7 to 17, preferably 7 to 12 carbon atoms which may have a substituent; or an alkenyl group having 2 to 15, preferably 2 to 5 carbon atoms which may have a substituent. In this regard, the above-described substituents are each independently halogen, an alkyl group having 1 to 20 carbon atoms or an aryl group having 6 to 12 carbon atoms. Further, $R_{18}$ and $R_{19}$, and $R_{20}$ and $R_{21}$, respectively, may be bonded together to form a carbocyclic ring or heterocyclic ring having 1 to 20 carbon atoms.

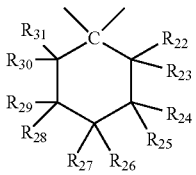

(6)

In general formula (6), $R_{22}$ to $R_{31}$ each independently represent a hydrogen atom or an alkyl group having 1 to 3 carbon atoms, and at least one, and preferably 3 of $R_{22}$ to $R_{31}$ are an alkyl group having 1 to 3 carbon atoms.

Examples of the dihydroxy compound represented by general formula (7) include 2,2-bis(4-hydroxyphenyl)propane (BPA), 1,1-bis(4-hydroxyphenyl)ethane, bis(4-hydroxyphenyl)methane, bis(4-hydroxyphenyl)-p-diisopropylbenzene, 4,4'-dihydroxydiphenyl, 2,2-bis(4-hydroxy-3,5-dimethylphenyl)propane, 2,2-bis(4-hydroxy-3-methylphenyl)propane, 2,2-bis(4-hydroxy-3,5-diethylphenyl)propane, 2,2-bis(4-hydroxy-3-ethylphenyl)propane, 2,2-bis(4-hydroxy-3,5-diphenylphenyl)propane, 2,2-bis(4-hydroxy-3-phenylphenyl)propane, 2,2-bis(4-hydroxy-3,5-dibromophenyl)propane, 2,2-bis(4-hydroxy-3-bromophenyl)propane, 2,2-bis(4-hydroxyphenyl)pentane, 2,4'-dihydroxy-diphenylmethane, bis-(4-hydroxy-3-methylphenyl)methane, bis-(4-hydroxy-3-nitrophenyl)methane, 1,1-bis(4-hydroxyphenyl)ethane, 1,1-bis(4-hydroxy-3-methylphenyl)ethane, 3,3-bis(4-hydroxyphenyl)pentane, 1,1-bis(4-hydroxyphenyl)cyclohexane [=bisphenol Z], bis(4-hydroxyphenyl)sulfone, 2,4'-dihydroxydiphenyl sulfone, bis(4-hydroxyphenyl) sulfide, 4,4'-dihydroxydiphenyl ether, 4,4'-dihydroxy-3,3'-dimethyldiphenyl ether, 4,4'-dihydroxy-2,5-diethoxydiphenyl ether, 1-phenyl-1,1-bis(4-hydroxyphenyl)ethane, 1,1-bis(4-hydroxy-3-methylphenyl)cyclohexane, 1-phenyl-1,1-bis(4-hydroxy-3-methylphenyl)ethane, bis(4-hydroxyphenyl)diphenylmethane, bis(4-hydroxy-3-methylphenyl)diphenylmethane, 9,9-bis(4-hydroxyphenyl)fluorene, 9,9-bis(4-hydroxy-3-methylphenyl)fluorene and 2,2-bis(4-hydroxyphenyl)hexafluoropropane. Among them, 2,2-bis(4-hydroxyphenyl)propane (BPA), 1,1-bis(4-hydroxyphenyl)ethane and bis(4-hydroxyphenyl)methane are more preferred, and from the viewpoint of stability as a monomer, a point that a product containing a smaller amount of impurities is easily available, etc., 2,2-bis(4-hydroxyphenyl)propane (BPA) is particularly preferred.

These dihydroxy compounds may be used solely, or two or more of them may be used in combination.

Further, the polycarbonate resin contained in the injection-molded body for vehicles of the present invention may have a branch structure according to need. For obtaining a polycarbonate resin having a branch structure, a polyhydroxy compound such as phloroglucin, 4,6-dimethyl-2,4,6-tris(4-hydroxyphenyl)heptene-2,4,6-dimethyl-2,4,6-tris(4-hydroxyphenyl)heptane, 2,6-dimethyl-2,4,6-tris(4- hydroxyphenyl)heptene-3,1,3,5-tris(4-hydroxyphenyl) benzene and 1,1,1-tris(4-hydroxyphenyl)ethane, or a multifunctional compound such as 3,3-bis(4-hydroxyaryl) oxyindole (=isatin bisphenol), 5-chlorisatin bisphenol, 5,7-dichlorisatin bisphenol and 5-bromisatin bisphenol may be used for substitution with a part of the above-described dihydroxy compound. Regarding the use amount, 0.01 to 10 mol %, and preferably 0.1 to 3 mol % of the entire dihydroxy compound can be substituted therewith.

<Carbonate-Ester-Forming Compound>

Examples of the carbonate-ester-forming compound to be used in the polycarbonate resin contained in the injection-molded body for vehicles of the present invention include phosgene, triphosgene, a carbonic acid diester and a carbonyl compound. Among such carbonate-ester-forming compounds, phosgene is particularly preferred from the viewpoint of qualities such as color phase and stability of resin obtained and the cost.

Examples of the carbonyl compound include carbon monoxide and carbon dioxide.

Examples of the carbonic acid diester include: a dialkyl carbonate compound such as dimethyl carbonate, diethyl carbonate and di-tert-butyl carbonate; and a diaryl carbonate compound such as diphenyl carbonate, di-p-tolyl carbonate, phenyl-p-tolyl carbonate and di-p-chlorophenyl carbonate. Among them, diphenyl carbonate, and a substituted diphenyl carbonate such as di-p-tolyl carbonate, phenyl-p-tolyl carbonate and di-p-chlorophenyl carbonate are preferred from the viewpoint of the reactivity, color phase of resin obtained and the cost. Particularly preferred is diphenyl carbonate. These carbonic acid diester compounds may be used solely, or two or more of them may be used in combination.

<End Terminator>

The end terminator to be used for the polycarbonate resin contained in the injection-molded body for vehicles of the present invention is a monohydric phenol represented by general formula (1a) below:

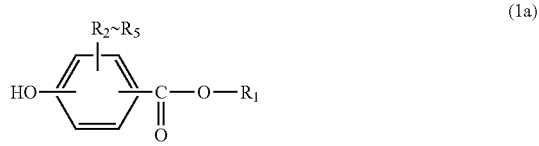

(1a)

In general formula (1a), $R_1$ represents an alkyl group having 5 to 23 carbon atoms or an alkenyl group having 8 to 36 carbon atoms. $R_2$ to $R_5$ each independently represent hydrogen, halogen, an alkyl group having 1 to 20 carbon atoms which may have a substituent, or an aryl group having 6 to 12 carbon atoms which may have a substituent. $R_2$ to $R_5$ are preferably hydrogen, halogen, an alkyl group having 1 to 9 carbon atoms which may have a substituent, or an aryl group having 6 to 8 carbon atoms which may have a substituent. In this regard, the above-described substituents are each independently halogen, an alkyl group having 1 to 20 carbon atoms or an aryl group having 6 to 12 carbon atoms.

It is preferred that $R_1$ in general formula (1a) is an alkyl group having 5 to 23 carbon atoms or an alkenyl group having 8 to 36 carbon atoms from the viewpoint of keeping flowability and thermal stability.

When the carbon number of $R_1$ in general formula (1a) is 23 or less, Tg of the polycarbonate resin contained in the injection-molded body for vehicles of the present invention is relatively high, and thermal stability tends to be improved. When the carbon number of $R_1$ is more than 5, flowability and impact resistance tend to be improved.

Further, the end terminator represented by general formula (1a) is more preferably an end terminator represented by general formula (8a):

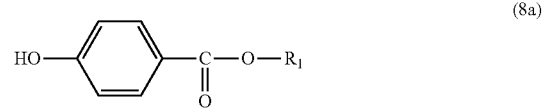

(8a)

In general formula (8a), $R_1$ represents an alkyl group having 5 to 23 carbon atoms. $R_1$ is an alkyl group having more preferably 6 to 22 carbon atoms, even more preferably 6 to 20 carbon atoms, and particularly preferably 8 to 16 carbon atoms.

Regarding specific examples of the end terminator, it is preferred to use any one of p-hydroxybenzoic acid 2-ethylhexyl ester, p-hydroxybenzoic acid 2-hexyldecyl ester, p-hydroxybenzoic acid hexadecyl ester and p-hydroxybenzoic acid docosyl ester, or a plurality of them as the end terminator from the viewpoint of heat resistance.

Moreover, it is more preferred to use one or the both of p-hydroxybenzoic acid 2-ethylhexyl ester and p-hydroxybenzoic acid hexadecyl ester as the end terminator from the viewpoint of ready availability in addition to heat resistance.

Depending on conditions for the production of the polycarbonate resin contained in the injection-molded body for vehicles of the present invention, an end group that is a remaining phenolic OH group, which does not react with the end terminator, may be formed. The smaller the amount of the phenolic OH group is, the better, from the viewpoint of hydrolysis resistance. Specifically, it is preferred that 80 mol % or more of the total amount of the end is blocked with the structure represented by general formula (1), and it is particularly preferred that 90 mol % or more of the total amount of the end is blocked with the structure represented by general formula (1).

Regarding the end terminator to be used in the present invention, depending on required characteristics of materials, two or more types of end terminators may be used in combination without departing from the gist of the present invention. Combined use with an end terminator having a structure other than the structure represented by general formula (1a) is acceptable.

Examples of the end terminator that may be used in combination include: an alkyl phenol such as phenol, p-cresol, o-cresol, 2,4-xylenol, p-t-butylphenol, o-allylphenol, p-allylphenol, p-hydroxystyrene, p-hydroxy-α-methylstyrene, p-propylphenol, p-cumylphenol, p-phenylphenol, o-phenylphenol, p-trifluoromethylphenol, p-nonylphenol, p-dodecylphenol, eugenol, amylphenol, hexylphenol, heptylphenol, octylphenol, nonylphenol, decylphenol, dodecylphenol, myristylphenol, palmitylphenol, stearylphenol and behenylphenol; and a p-hydroxybenzoic acid alkyl ester such as a methyl ester, ethyl ester, propyl ester, butyl ester, amyl ester, hexyl ester or heptyl ester of p-hydroxybenzoic acid. Further, it is possible to use two or more types of the above-described end terminators in combination. Particularly, p-t-butylphenol may be used as the end terminator for combined use from the viewpoint of the purity and cost.

When using other end terminators, the amount thereof is preferably 20 mol % or less, and more preferably 10 mol % or less of the total amount of all the end terminators.

<Use Amount of End Terminator (Monohydric Phenol)>

The molecular weight of the polycarbonate resin contained in the injection-molded body for vehicles of the present invention is controlled by the use amount of the end terminator.

The polymerization degree of the dihydroxy compound to be used for the main skeleton and the use amount of the end terminator are shown by the below-described mathematical formula (I):

$$\text{Use amount of end terminator (mol)} = \text{Use amount of dihydroxy compound (mol)} \div \text{Polymerization degree of main skeleton} \times 2 \quad (I)$$

The use amount of the end terminator (monohydric phenol) and the use amount of the dihydroxy compound are determined based on this formula, but the range of the use amount of the dihydroxy compound (mol): the use amount of the end terminator (mol) is preferably 50:1 to 4:1, more preferably 40:1 to 6:1, and particularly preferably 30:1 to 6:1.

Depending on required characteristics of materials, the polycarbonate resin contained in the injection-molded body for vehicles of the present invention may be mixed with another resin and various additives without departing from the gist of the present invention.

[Another Resin Which Can be Mixed]

Another resin may be contained in the injection-molded body for vehicles of the present invention according to need. Examples of the another resin include: a thermoplastic polyester resin such as a polycarbonate resin other than the polycarbonate resin to be used in the present invention, a polyethylene terephthalate resin (PET resin), polytrimethylene terephthalate (PTT resin) and a polybutyrene terephthalate resin (PBT resin); a styrene-based resin such as a polystyrene resin (PS resin), a high impact polystyrene resin (HIPS), an acrylonitrile-styrene copolymer (AS resin) and a methyl methacrylate-styrene copolymer (MS resin); a core/shell type elastomer such as a methyl methacrylate-acrylic rubber-styrene copolymer (MAS); an elastomer such as a polyester-based elastomer; a polyolefin resin such as a cyclic cycloolefin resin (COP resin) and a cyclic cycloolefin (COP) copolymer resin; a polyamide resin (PA resin); a polyimide resin (PI resin); a polyetherimide resin (PEI resin); a polyurethane resin (PU resin); a polyphenylene ether resin (PPE resin); a polyphenylene sulfide resin (PPS resin); a polysulfone resin (PSU resin); a polymethacrylate resin (PMMA resin); and polycaprolactone. Particularly preferred resins for mixing are PS resin, AS resin and PMMA resin.

The component ratio of the another resin in the injection-molded body for vehicles of the present invention is preferably 10% by mass or less, and more preferably 1% by mass or less of all the resin components. When the component ratio of the another resin is 10% by mass or less, physical properties can be maintained.

[Additives]

Various additives may be blended in the injection-molded body for vehicles of the present invention without departing from the gist of the present invention. Examples of such additives include at least one additive selected from the group consisting of a thermal stabilizer, an antioxidant, a flame retardant, a flame retardant auxiliary agent, an ultraviolet absorber, a mold release agent and a coloring agent.

Moreover, an antistatic agent, a fluorescent brightener, an antifog additive, a flowability improving agent, a plasticizer, a dispersing agent, an antimicrobial agent, etc. may also be added as long as desired physical properties are not significantly impaired.

Examples of the thermal stabilizer include phenol-based, phosphorus-based and sulfur-based thermal stabilizers. Specific examples thereof include: a phosphorus oxoacid such as phosphoric acid, phosphonic acid, phosphorous acid, phosphinic acid and polyphosphoric acid; an acid pyrophosphate metal salt such as sodium acid pyrophosphate, potassium acid pyrophosphate and calcium acid pyrophosphate; a phosphate of a metal belonging to group 1 or 10 such as potassium phosphate, sodium phosphate, cesium phosphate and zinc phosphate; an organic phosphate compound; an organic phosphite compound; and an organic phosphonite compound. Alternatively, examples include at least one type selected from the group consisting of: (a) a phosphite ester compound in which at least one ester in the molecule is esterified with phenol and/or phenol having at least one alkyl group having 1 to 25 carbon atoms; (b) phosphorous acid; and (c) tetrakis(2,4-di-tert-butylphenyl)-4,4'-biphenylene-di-phosphonite. Specific examples of the phosphite ester compound (a) include trioctyl phosphite, trioctadecyl phosphite, tridecyl phosphite, trilauryl phosphite, tristearyl phosphite, triphenyl phosphite, tris(monononylphenyl)phosphite, tris(monononyl/dinonyl phenyl)phosphite, trisnonylphenyl phosphite, tris(octylphenyl)phosphite, tris(2,4-di-tert-butylphenyl)phosphite, trinonyl phosphite, didecylmonophenyl phosphite, dioctyl monophenyl phosphite, diisopropyl monophenyl phosphite, monobutyl diphenyl phosphite, monodecyl diphenyl phosphite, bis(2,4-di-tert-butylphenyl) pentaerythritol phosphite, bis(2,6-di-tert-butyl-4-methylphenyl)pentaerythritol phosphite, monooctyl diphenyl phosphite, distearylpentaerythritol diphosphite, tricyclohexyl phosphite, diphenylpentaerythritol diphosphite, bis(2,6-di-tert-butyl-4-methylphenyl)pentaerythritol diphosphite, 2,2-methylene bis(4,6-di-tert-butylphenyl)octyl phosphite, bis(nonylphenyl)pentaerythritol diphosphite, bis(2,4-di-tert-butylphenyl)pentaerythritol diphosphite and bis(2,6-di-tert-butyl-4-ethylphenyl)pentaerythritol diphosphite. These compounds may be used solely, or two or more of them may be used in combination.

Specific examples of the organic phosphite compound include "ADK STAB 1178", "ADK STAB 2112" and "ADK STAB HP-10" (trade names; the same applies to the following) manufactured by ADEKA Corporation, "JP-351", "JP-360" and "JP-3CP" manufactured by Johoku Chemical Co., Ltd., and "Irgafos 168" manufactured by BASF.

Examples of the phosphoric acid-based stabilizer include trimethyl phosphate, triethyl phosphate, tributyl phosphate, trioctyl phosphate, triphenyl phosphate, tricresyl phosphate, tris(nonylphenyl) phosphate and 2-ethylphenyldiphenyl phosphate. Note that one of such phosphorus-based stabilizers may be contained, or two or more of them may be contained in any combination and at any ratio.

The ratio of the thermal stabilizer to be added, when blended, is, for example, 0.001 parts by mass or more, preferably 0.01 parts by mass or more, and more preferably 0.03 parts by mass or more, while 1 parts by mass or less, preferably 0.7 parts by mass or less, and more preferably 0.5 parts by mass or less, relative to 100 parts by mass of the polycarbonate resin. When the amount of the thermal stabilizer is too small, the effect of thermal stabilization may be insufficient, and when the amount of the thermal stabilizer is too large, the effect may peak out and it may be non-economic.

Examples of the antioxidant include a phenol-based antioxidant, a hindered phenol-based antioxidant, a bisphenol-based antioxidant and a polyphenol-based antioxidant. Specific examples thereof include 2,6-di-tert-butyl-4-methylphenol, tris(3,5-di-tert-butyl-4-hydroxybenzyl)

isocyanurate, n-octadecyl-3-(3',5'-di-tert-butyl-4'-hydroxyphenyl)propionate, tetrakis[methylene-3-(3,5-di-tert-butyl-4-hydroxyphenyl)propionate]methane, 4,4'-butylidene bis-(3-methyl-6-tert-butylphenol), triethylene glycol-bis[3-(3-tert-butyl-4-hydroxy-5-methylphenyl)propionate], 3,9-bis{2-[3-(3-tert-butyl-4-hydroxy-5-methylphenyl)propionyloxy]-1,1-dimethylethyl}-2,4,8,10-tetraoxaspiro[5,5]undecane, pentaerythritol tetrakis[3-(3,5-di-tert-butyl-4-hydroxyphenyl)propionate], thiodiethylene bis[3-(3,5-di-tert-butyl-4-hydroxyphenyl)propionate], N,N'-hexane-1,6-diyl bis[3-(3,5-di-tert-butyl-4-hydroxyphenyl propionamide), 2,4-dimethyl-6-(1-methyl pentadecyl)phenol, diethyl[[3,5-bis(1,1-dimethylethyl)-4-hydroxyphenyl]methyl]phosphate, 3,3',3'',5,5',5''-hexa-tert-butyl-a,a',a''-(mesitylene-2,4,6-triyl)tri-p-cresol, 4,6-bis(octylthiomethyl)-o-cresol, ethylene bis(oxyethylene) bis[3-(5-tert-butyl-4-hydroxy-m-tolyl)propionate], hexamethylene bis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, and 2,6-di-tert-butyl-4-(4,6-bis(octylthio)-1,3,5-triazine-2-ylamino)phenol.

Specific examples of the phenol-based antioxidant include "Irganox 1010" (registered trademark; the same applies to the following) and "Irganox 1076" manufactured by BASF, and "ADK STAB AO-50" and "ADK STAB AO-60" manufactured by ADEKA Corporation. Note that one of such phenol-based stabilizers may be contained, or two or more of them may be contained in any combination and at any ratio.

The ratio of the antioxidant to be added, when blended, is, for example, 0.001 parts by mass or more, and preferably 0.01 parts by mass or more, while 1 parts by mass or less, and preferably 0.5 parts by mass or less, relative to 100 parts by mass of the polycarbonate resin. When the ratio of the antioxidant added is too small, the effect as the antioxidant may be insufficient, and when the ratio of the antioxidant added is too large, the effect may peak out and it may be non-economic.

Examples of the flame retardant include an organic sulfonic acid metal salt. Examples of the organic sulfonic acid metal salt include an aliphatic sulfonic acid metal salt and an aromatic sulfonic acid metal salt. These substances may be used solely, or two or more of them may be used in combination. Further, as a metal salt, an alkaline metal salt and an alkaline earth metal salt are preferred. Examples of an alkali metal include sodium, lithium, potassium, rubidium and cesium. Examples of an alkali earth metal include calcium and strontium. The metal of the organic sulfonic acid metal salt to be used in the present invention is preferably an alkali metal such as sodium, potassium, rubidium and cesium, and more preferably sodium or potassium. By employing such a metal, the effect of effectively promoting the formation of a carbonized layer at the time of burning and the effect of maintaining high transparency can be obtained.

Preferred examples of the aliphatic sulfonic acid metal salt include a fluoroalkane-sulfonic acid metal salt, and more preferred examples thereof include a perfluoroalkane-sulfonic acid metal salt.

Further, examples of the fluoroalkane-sulfonic acid metal salt include an alkaline metal salt and an alkaline earth metal salt, and among them, an alkaline metal salt is preferred. The carbon number of the fluoroalkane-sulfonic acid metal salt is preferably 1 to 8, and more preferably 2 to 4. When the carbon number is within the aforementioned range, the effect of maintaining high transparency is obtained. Specific preferred examples of the fluoroalkane-sulfonic acid metal salt include sodium perfluorobutane-sulfonate, potassium perfluorobutane-sulfonate, sodium perfluoroethane-sulfonate and potassium perfluoroethane-sulfonate.

Examples of the aromatic sulfonic acid metal salt include an alkaline metal salt and an alkaline earth metal salt, and among them, an alkaline metal salt is preferred. Specific examples of aromatic sulfonic acid alkaline metal salts include sodium 3,4-dichlorobenzene sulfonate salt, sodium 2,4,5-trichlorobenzene sulfonate salt, sodium benzene sulfonate salt, sodium salt of diphenylsulfone-3-sulfonic acid, potassium salt of diphenylsulfone-3-sulfonic acid, sodium salt of 4,4'-dibromodiphenyl-sulfone-3-sulfonic acid, potassium salt of 4,4'-dibromophenyl-sulfone-3-sulfonic acid, disodium salt of diphenylsulfone-3,3'-disulfonic acid, dipotassium salt of diphenylsulfone-3,3'-disulfonic acid, sodium dodecylbenzene sulfonate salt, potassium dodecylbenzene sulfonate salt, potassium p-toluene sulfonate salt and potassium p-styrene sulfonate salt.

In particular, from the viewpoint of improving transparency of molded bodies, the organic sulfonic acid metal salt which can be used for the injection-molded body for vehicles of the present invention is preferably potassium salt of diphenylsulfone-3-sulfonic acid, potassium p-toluene sulfonate salt, potassium p-styrene sulfonate salt or potassium dodecylbenzene sulfonate salt, and more preferably potassium salt of diphenylsulfone-3-sulfonic acid. The mass value of the organic sulfonic acid metal salt to be added is 0.005 to 0.1 parts by mass, preferably 0.01 to 0.1 parts by mass, and more preferably 0.03 to 0.09 parts by mass relative to 100 parts by mass of the polycarbonate resin. Further, in the present invention, a flame retardant other than the organic sulfonic acid metal salt may also be added.

As the flame retardant auxiliary agent, for example, a silicone compound may be added. The silicone compound preferably has a phenyl group in the molecule. When the silicone compound has a phenyl group, dispersibility of the silicone compound in polycarbonate is improved, and it is possible to obtain excellent transparency and flame retardance. The mass-average molecular weight of the silicone compound is preferably 450 to 5,000, more preferably 750 to 4,000, even more preferably 1,000 to 3,000, and particularly preferably 1,500 to 2,500. When the mass-average molecular weight is 450 or more, it is easier to carry out the production and to adapt to industrial production, and heat resistance of the silicone compound is not easily reduced. Meanwhile, when the mass-average molecular weight of the silicone compound is 5,000 or less, dispersibility in the polycarbonate resin is not easily reduced, and as a result, reduction in flame retardance of molded bodies and reduction in mechanical physical properties tend to be more effectively suppressed.

The ratio of the flame retardant auxiliary agent to be added, when blended, is, for example, 0.1 parts by mass or more, and preferably 0.2 parts by mass or more, while 7.5 parts by mass or less, and preferably 5 parts by mass or less, relative to 100 parts by mass of the polycarbonate resin. When the ratio of the flame retardant auxiliary agent to be added is too small, flame retardance may be insufficient, and when the ratio of the flame retardant auxiliary agent to be added is too large, poor outer appearance such as delamination may be caused, transparency may be reduced, flame retardance may peak out and it may be non-economic.

Examples of the ultraviolet absorber include an inorganic ultraviolet absorber such as cerium oxide and zinc oxide, and an organic ultraviolet absorber such as a benzotriazole compound, a benzophenone compound, a salicylate compound, a cyanoacrylate compound, a triazine compound, an oxanilide compound, a malonate compound, a hindered amine compound and a phenyl salicylate compound. Among them, a benzotriazole-based or benzophenone-based organic ultraviolet absorber is preferred. In particular, specific examples of the benzotriazole compound include 2-(2'-hydroxy-5'-methylphenyl)benzotriazole, 2-[2'-hydroxy-3', 5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole), 2-(2'-hydroxy-3',5'-di-tert-amyl)-benzotriazole, 2-(2'-hydroxy-5'-tert-octylphenypbenzotriazole, 2,2'-methylene bis[4-(1,1,3,3-tetramethylbutyl)-6-(2N-benzotriazole-2-yl)phenol], 2-(4,6-diphenyl-1,3,5-triazine-2-yl)-5-[(hexyl)oxy]-phenol, 2-[4,6-bis(2,4-dimethylphenyl)-1,3,5-triazine-2-yl]-5-(octyloxy) phenol, 2,2'-(1,4-phenylene)bis[4H-3,1-benzoxazine-4-one], [(4-methoxyphenyl)-methylene]-propanedioic acid-dimethyl ester, 2-(2-benzotriazole-2-yl)-p-cresol, 2-(2H-benzotriazole-2-yl)-4,6-bis(1-methyl-1-phenylmethyl) phenol, 2-[5-chloro(2H)-benzotriazole-2-yl]-4-methyl-6-(tert-butyl)phenol, 2,4-di-tert-butyl-6-(5-chlorobenzotriazole-2-yl)phenol, 2-(2H-benzotriazole-2-yl)-4-(1,1,3,3-tetrabutyl)phenol, 2,2'-methylene bis[6-(2H-benzotriazole-2-yl)-4-(1,1,3,3-tetrabutyl)phenol], and [methyl-3-[3-tert-butyl-5-(2H-benzotriazole-2-yl)-4-hydroxyphenyl]propionate-polyethylene glycol] condensate. Two or more of the above-described compounds may be used in combination. Among the above-described compounds, preferred are 2-(2'-hydroxy-5'-tert-octylphenyl)benzotriazole and 2,2'-methylene-bis[4-(1,1,3,3-tetramethylbutyl)-6-(2N-benzotriazole2-yl)phenol]. Further, specific examples of the benzophenone-based ultraviolet absorber include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-dihydroxy-4-methoxy-benzophenone, 2,2'-dihydroxy-4,4'-dimethoxy-benzophenone and 2,2',4,4'-tetrahydroxy-benzophenone. Specific examples of the phenyl salicylate-based ultraviolet absorber include phenyl salicylate and 4-tert-butyl-phenyl-salicylate. Specific examples of the triazine-based ultraviolet absorber include 2-(4,6-diphenyl-1,3,5-triazine-2-yl)-5-[(hexyl)oxy]-phenol and 2-[4,6-bis(2,4-dimethylphenyl)-1, 3,5-triazine-2-yl]-5-(octyloxy)phenol. Specific examples of the hindered amine-based ultraviolet absorber include bis(2, 2,6,6-tetramethylpiperidine-4-yl)sebacate.

The ratio of the ultraviolet absorber to be added, when blended, is, for example, 0.01 parts by mass or more, and preferably 0.1 parts by mass or more, while 3 parts by mass or less, and preferably 1 part by mass or less, relative to 100 parts by mass of the polycarbonate resin. When the ratio of the ultraviolet absorber added is too small, the effect of improving weather resistance may be insufficient, and when the ratio of the ultraviolet absorber added is too large, mold deposit, etc. may be generated on a molded body and mold contamination may be caused at the time of molding.

Examples of the mold release agent include carboxylate ester, a polysiloxane compound and a paraffin wax (polyolefin-based). Specific examples thereof include at least one type of compound selected from the group consisting of an aliphatic carboxylic acid, an ester of an aliphatic carboxylic acid and an alcohol, an aliphatic hydrocarbon compound with a number-average molecular weight of 200 to 15,000, and polysiloxane-based silicone oil. Examples of the aliphatic carboxylic acid include a saturated or unsaturated aliphatic monovalent, divalent or trivalent carboxylic acid.

In this regard, the aliphatic carboxylic acid also includes an alicyclic carboxylic acid. Among them, the aliphatic carboxylic acid is preferably a monovalent or divalent carboxylic acid having 6 to 36 carbon atoms, and more preferably an aliphatic saturated monovalent carboxylic acid having 6 to 36 carbon atoms. Specific examples of the aliphatic carboxylic acid include palmitic acid, stearic acid, valeric acid, caproic acid, capric acid, lauric acid, arachic acid, behenic acid, lignoceric acid, cerotic acid, melissic acid, tetratriacontanoic acid, montanic acid, glutaric acid, adipic acid and azelaic acid. As the aliphatic carboxylic acid in the ester of the aliphatic carboxylic acid and the alcohol, the same aliphatic carboxylic acid as described above can be used. Meanwhile, examples of the alcohol include a saturated or unsaturated monovalent or polyvalent alcohol. Such alcohols may have a fluorine atom and a substituent such as an aryl group. Among them, a monovalent or polyvalent saturated alcohol having 30 or less carbon atoms is preferred, and an aliphatic saturated monovalent alcohol or polyvalent alcohol having 30 or less carbon atoms is more preferred. In this regard, the aliphatic also includes an alicyclic compound. Specific examples of the alcohol include octanol, decanol, dodecanol, stearyl alcohol, behenyl alcohol, ethylene glycol, diethylene glycol, glycerin, pentaerythritol, 2,2-dihydroxy perfluoropropanol, neopentylene glycol, ditrimethylolpropane and dipentaerythritol. The above-described ester compound may contain an aliphatic carboxylic acid and/or an alcohol as impurities, and may be a mixture of a plurality of compounds. Specific examples of the ester of the aliphatic carboxylic acid and the alcohol include beeswax (a mixture consisting mainly of myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate and pentaerythritol tetrastearate. Examples of the aliphatic hydrocarbon with a number-average molecular weight of 200 to 15,000 include liquid paraffin, paraffin wax, microcrystalline wax, polyethylene wax, Fischer-Tropsch wax and an α-olefin oligomer having 3 to 12 carbon atoms. In this regard, the aliphatic hydrocarbon also includes an alicyclic hydrocarbon. Further, these hydrocarbon compounds may be partially oxidized. Among them, paraffin wax, polyethylene wax and a partially oxidized product of polyethylene wax are preferred, and paraffin wax and polyethylene wax are more preferred. The number-average molecular weight is preferably 200 to 5,000. These aliphatic hydrocarbons may be a single substance or a mixture of those with various constituents or various molecular weights as long as the main component is within the above-described range. Examples of the polysiloxane-based silicone oil include dimethyl silicone oil, phenylmethyl silicone oil, diphenyl silicone oil and fluorinated alkyl silicone. Two or more types of them may be used in combination.

The ratio of the mold release agent to be added, when blended, is preferably 0.001 parts by mass or more, and more preferably 0.01 parts by mass or more, while 2 parts by mass or less, and preferably 1 part by mass or less, relative to 100 parts by mass of the polycarbonate resin. When the ratio of the mold release agent added is too small, the effect of mold release characteristics at the time of molding may be insufficient, and when the ratio of the mold release agent added is too large, hydrolysis resistance of a molded body may be reduced, and mold contamination, etc. may be caused at the time of injection molding.

Examples of a stain pigment as the coloring agent include an inorganic pigment, an organic pigment and an organic dye. Examples of the inorganic pigment include: a sulfide-based pigment such as carbon black, cadmium red and cadmium yellow; a silicate-based pigment such as ultramarine; an oxide-based pigment such as titanium oxide, Chinese white, Bengal red, chromium oxide, iron black, titan yellow, zinc-iron brown, titanium cobalt green, cobalt green, cobalt blue, copper-chrome black and copper-iron black; a chromic acid-based pigment such as chrome yellow and molybdate orange; and a ferrocyanide-based pigment such as prussian blue. Further, examples of the organic pigment and the organic dye as the coloring agent include: a phthalocyanine-based stain pigment such as copper phthalocyanine blue and copper phthalocyanine green; an azo-based stain pigment such as nickel azo yellow; a condensed polycyclic stain pigment such as thioindigo-based, perinone-based, perylene-based, quinacridone-based, dioxazine-based, isoindolinone-based and quinophthalone-based stain pigments; and quinolone-based, anthraquinone-based, heterocyclic and methyl-based stain pigments. Among them, from the viewpoint of thermal stability, titanium oxide, carbon black, cyanine-based, quinolone-based, anthraquinone-based and phthalocyanine-based stain pigments, etc. are preferred. Note that one of such stain pigments may be contained, or two or more of them may be contained in any combination and at any ratio. Moreover, for the purpose of improving handling property at the time of extrusion and improving dispersibility in the resin composition, the stain pigment may be made into a masterbatch with a polystyrene resin, a polycarbonate resin or an acrylic resin.

The ratio of the coloring agent to be added, when blended, is, for example, 5 parts by mass or less, preferably 3 parts by mass or less, and more preferably 2 parts by mass or less relative to 100 parts by mass of the polycarbonate resin. When the ratio of the coloring agent added is too large, impact resistance of a molded body may be insufficient.

[Method for Producing Polycarbonate Resin]

The polycarbonate resin contained in the molded body of the present invention can be synthesized based on a publicly-known method, and examples thereof include various synthesis methods including the interfacial polymerization method, the pyridine method, the transesterification method and the ring-opening polymerization method for a cyclic carbonate compound. Specifically, a polymer of a linear thermoplastic polycarbonate is obtained by reacting a dihydroxy compound with a carbonate-ester-forming compound. Further, when the above-described polyhydroxy compound or polyfunctional compound is used in combination, a copolymer of a branched thermoplastic polycarbonate is obtained.

Regarding a reaction according to the interfacial polymerization method, usually, pH is kept at 10 or higher in the presence of a reaction-inert organic solvent and an alkali aqueous solution, and an aromatic dihydroxy compound, an end terminator and an antioxidant for preventing oxidation of the aromatic dihydroxy compound (if required) are used for reaction with phosgene, and then a polymerization catalyst such as a tertiary amine or quaternary ammonium salt is added to perform interfacial polymerization, thereby obtaining a polycarbonate resin. Addition of the end terminator is not particularly limited as long as it is carried out during the period between the phosgenation and the initiation of polymerization reaction. The reaction temperature is 0 to 35° C., and the reaction time is several minutes to several hours.

In this regard, examples of the reaction-inert organic solvent include a chlorinated hydrocarbon such as dichloromethane, 1,2-dichloroethane, chloroform, monochlorobenzene and dichlorobenzene, and an aromatic hydrocarbon such as benzene, toluene and xylene. As the end terminator, other than the aforementioned compounds, a compound having a monovalent phenolic hydroxyl group can be used in combination within a range in which the effects of the present invention are not reduced. Examples of the polymerization catalyst include: tertiary amines such as trimethylamine, triethylamine, tributylamine, tripropylamine, trihexylamine and pyridine; and quaternary ammonium salts such as trimethylbenzylammonium chloride, tetramethylammonium chloride and triethylbenzylammonium chloride.

Flakes of the polycarbonate resin obtained according to the above-described method can be obtained, for example: by dropping a dichloromethane solution containing the polycarbonate resin obtained by the interfacial polymerization method into warm water with its temperature being kept at 45° C. and then removing the solvent by evaporation; or by putting the dichloromethane solution containing the polycarbonate resin obtained by the interfacial polymerization method into methanol and filtering and drying the precipitated polymer; or by agitating the dichloromethane solution containing the polycarbonate resin obtained by the interfacial polymerization method with a kneader while agitating and pulverizing it with the temperature being kept at 40° C. and then removing the solvent from the resultant with hot water at 95° C. or higher.

A reaction according to the transesterification method is a transesterification reaction between a carbonic acid diester and a dihydroxy compound. Usually, the molecular weight and the amount of terminal hydroxyl groups of a desired polycarbonate resin are determined by adjusting the mixing ratio between a carbonic acid diester and an aromatic dihydroxy compound and adjusting the pressure reducing degree during the reaction. The amount of terminal hydroxyl groups significantly affects thermal stability, hydrolytic stability, color tone, etc. of the polycarbonate resin, and for imparting practical physical properties, the amount is preferably 1,000 ppm or less, and more preferably 700 ppm or less. The carbonic acid diester is used generally in an equimolar amount or more, and preferably in an amount of 1.01 to 1.30 mol relative to 1 mol of the dihydroxy compound.

When synthesizing the polycarbonate resin by means of the transesterification method, a transesterification catalyst is usually used. The transesterification catalyst is not particularly limited, but an alkali metal compound and/or an alkaline earth metal compound is mainly used. Further, a basic compound such as a basic boron compound, a basic phosphorus compound, a basic ammonium compound or an amine-based compound can be supplementally used in combination. Examples of the transesterification reaction using such raw materials include a method in which: a mixture of a dihydric phenol, a monohydric phenol (end terminator) and a carbonic acid diester is supplied to a reactor under melting conditions to perform a reaction at a temperature of 100 to 320° C.; and finally, a melt polycondensation reaction is performed while removing by-products such as an aromatic hydroxy compound under a reduced pressure of $2.7 \times 10^2$ Pa (2 mmHg) or less. Either a batch type or continuous type melt polycondensation reaction can be performed, but from the viewpoint of stability, etc., continuous type melt polycondensation is preferably employed for the polycarbonate resin to be used in the present invention.

In the transesterification method, a compound for neutralizing a catalyst, for example, a sulfur-containing acidic compound or derivative made therefrom is preferably used as a deactivator for the catalyst in the polycarbonate resin. The amount thereof is 0.5 to 10 equivalents, and preferably 1 to 5 equivalents of an alkali metal of the catalyst, and it is usually added to the polycarbonate resin in an amount of 1 to 100 ppm, and preferably 1 to 20 ppm.

To the polycarbonate resin contained in the injection-molded body for vehicles of the present invention, various additives may be added at any ratio, and it is possible to obtain a polycarbonate resin pellet by a well-known strand-type cold cut process (a method in which a melted polycarbonate resin composition is molded into a strand shape, cooled, and then it is cut into a predetermined shape for pelletization), an in-air hot-cut process (a method in which a melted polycarbonate resin is cut into a pellet shape in air before the resin contacts with water), or an in-water hot-cut process (a method in which a melted polycarbonate resin is cut and cooled at the same time in water for pelletization). The obtained polycarbonate resin pellet is preferably dried according to, for example, a drying method using a hot air drying oven, a vacuum drying oven or a dehumidification drying oven.

[Evaluation Methods]
<Molecular Weight>

The molecular weight of the polycarbonate resin contained in the molded body of the present invention is evaluated based on the viscosity-average molecular weight (Mv) which is measured under the below-described conditions using an Ubbelohde viscometer.

<Conditions for Measuring Viscosity-Average Molecular Weight (Mv)>

Measurement apparatus: Ubbelohde capillary viscometer
Solvent: dichloromethane
Concentration of resin solution: 0.5 gram/deciliter
Measurement temperature: 25° C.

The measurement is carried out under the above-described conditions to determine a limiting viscosity [η] deciliter/gram with a Huggins constant of 0.45, and calculation is carried out according to the below-described mathematical formula (II).

$$\eta = 1.23 \times 10^{-4} \times Mv^{0.83} \quad \text{(II)}$$

The viscosity-average molecular weight (Mv) of the polycarbonate resin contained in the injection-molded body for vehicles of the present invention is 18,000 to 24,000. The viscosity-average molecular weight (Mv) is preferably 18,500 to 24,000, more preferably 19,000 to 23,500, and particularly preferably 19,000 to 23,000. When the viscosity-average molecular weight (Mv) is 18,000 or more, mechanical strength is improved, and when it is 24,000 or less, melt viscosity is reduced and flowability is improved, and a fine and long-shaped/large-sized molded product can be easily molded.

<Volume Flow Rate (Q Value)>

The melt flowability of the polycarbonate resin contained in the injection-molded body for vehicles of the present invention is evaluated based on the volume flow rate (Q value) which is measured under the below-described conditions using a Koka flow tester. A higher Q value represents higher melt flowability, and a lower Q value represents lower melt flowability.

<Q Value Measurement Conditions>
Measurement apparatus: Flow tester for evaluation of flow characteristics
Load: 160 kgf/cm$^2$
Orifice: diameter 1 mm×length 10 mm
Measurement temperature: 280° C.

For a test, for example, CFT-500D manufactured by Shimadzu Corporation can be used.

The Q value of the polycarbonate resin contained in the injection-molded body for vehicles of the present invention measured under the above-described measurement conditions at a measurement temperature of 280° C. is preferably $10 \times 10^{-2}$ cc/sec or more, more preferably $12 \times 10^{-2}$ cc/sec or more, even more preferably $15 \times 10^{-2}$ cc/sec or more, and particularly preferably $20 \times 10^{-2}$ cc/sec or more. When the Q value is within the above-described range, a fine/large-sized molded product can be molded. In addition, production stability of molded bodies is improved, and energy consumption during the production of molded bodies can be suppressed. Meanwhile, when the Q value is less than $10 \times 10^{-2}$ cc/sec, since melt flowability is reduced, it is required to perform molding under a higher temperature condition than usual, and for this reason, energy consumption tends to be increased and a resin tends to be decomposed. Further, the Q value is preferably $70 \times 10^{-2}$ cc/sec or less, and more preferably $50 \times 10^{-2}$ cc/sec or less. When the Q value is $70 \times 10^{-2}$ cc/sec or less, molding defects such as generation of sink marks or cavities tend to be more effectively prevented.

<Conditions for Measuring Glass Transition Temperature>
Measurement apparatus: differential scanning calorimeter (DSC)
Temperature raising rate: 10° C./min
Gas flow environment: nitrogen, 20 ml/min
Sample pretreatment: heating and melting at 300° C.

For a test, for example, a differential scanning calorimeter (DSC) DSC-50 manufactured by Shimadzu Corporation can be used.

The glass transition temperature of the polycarbonate resin contained in the molded body of the present invention is preferably 105° C. or higher, more preferably 110° C. or higher, and even more preferably 115° C. or higher. When the glass transition temperature is within the above-described range, a product having excellent heat resistance can be obtained. When the glass transition temperature is 105° C. or higher, a molded body having more excellent heat resistance tends to be obtained.

<Izod Impact Strength>

The impact resistance of the polycarbonate resin contained in the molded body of the present invention is evaluated according to the Izod impact strength based on ASTM-D256. For a test, for example, an Izod impact tester manufactured by Toyo Seiki Seisaku-sho, Ltd. can be used.

The Izod impact strength of the molded body of the present invention is preferably 200 J/m or more, more preferably 250 J/m or more, even more preferably 300 J/m or more, particularly preferably 450 J/m or more, and most preferably 500 J/m or more. When the Izod impact strength is within the above-described range, breaking of molded bodies and generation of cracks in molded bodies during or after molding can be more effectively prevented.

[Intended Use]

The injection-molded body for vehicles of the present invention is excellent in heat resistance and impact resistance compared to a molded body made of conventional polycarbonate resin and can become a molded body having a fine structure, and therefore can be suitably used as an electric/electronic component, machine component or vehicle component for vehicles. Examples of these components include an automobile interior panel, an automobile lamp lens, an automobile inner lens, an automobile lens protection cover and an automobile light guide. According to one embodiment of the present invention, it is possible to provide an automobile light guide, an automobile interior panel and an automobile lamp lens, each of which comprises the molded body of the present invention as a member.

[Molding Method]

The method for producing the injection-molded body for vehicles of the present invention is not particularly limited, and it is possible to arbitrarily employ a molding method generally employed for polycarbonate resins. Examples of the molding method include the melting injection molding method, the ultra-high-speed injection molding method, the injection compression molding method, the two-color molding method, the blow molding method such as gas-assisted molding, a molding method using a heat insulating mold, a molding method using a rapid heating mold, the extrusion molding method, the sheet molding method, the thermoforming method, the rotational molding method, the laminate molding method and the press molding method. It is also possible to use a molding method using the hot runner system. Particularly preferred is the melting injection molding method.

EXAMPLES

Hereinafter, the present invention will be described in more detail based on working examples, but the present invention is not limited to the below-described working examples as long as they do not depart from the gist of the present invention. Raw materials and evaluation methods used in the below-described examples are as described below.

<Measurement of Molecular Weight>

The molecular weight of a polycarbonate resin contained in a molded body obtained in the working examples was evaluated based on the viscosity-average molecular weight (Mv) which was measured under the below-described conditions using an Ubbelohde viscometer.

<Conditions for Measuring Viscosity-Average Molecular Weight (Mv)>

Measurement apparatus: Ubbelohde capillary viscometer
Solvent: dichloromethane
Concentration of resin solution: 0.5 gram/deciliter
Measurement temperature: 25° C.

The measurement was carried out under the above-described conditions to determine a limiting viscosity [η] deciliter/gram with a Huggins constant of 0.45, and calculation was carried out according to the below-described mathematical formula (II).

$$\eta=1.23\times10^{-4}\times Mv^{0.83} \quad (II)$$

<Evaluation of Moldability>

Using an injection molding machine ("HSP100A" manufactured by Sodick Co., Ltd.), a light guide-type test piece (3 mm×3 mm×300 mm) was molded at a resin temperature of 340° C. and at a mold temperature of 105° C., and during this, evaluation of the molded body was carried out based on the presence or absence of filling insufficiency and occurring of deformation/cracking of a molded product, etc.

<Q Value Measurement Conditions>

Measurement apparatus: Flow tester for evaluation of flow characteristics
Load: 160 kgf/cm$^2$
Orifice: diameter 1 mm×length 10 mm
Measurement temperature: 280° C.
Measurement apparatus: CFT-500D manufactured by Shimadzu Corporation <Conditions for Measuring Glass Transition Temperature>

Measurement apparatus: differential scanning calorimeter (DSC)
Temperature raising rate: 10° C./min
Gas flow environment: nitrogen, 20 ml/min
Sample pretreatment: heating and melting at 300° C.
Measurement apparatus: differential scanning calorimeter (DSC) DSC-50 manufactured by Shimadzu Corporation <Izod Impact Strength>

The impact resistance of the molded body of the present invention was evaluated according to the notched Izod impact strength based on ASTM-D256.

Measurement apparatus: Izod impact tester manufactured by Toyo Seiki Seisaku-sho, Ltd.

[Production of End Terminator]

Production Example 1

Based on Handbook of Organic Chemistry (in Japanese) (3rd edition; edited by The Society of Synthetic Organic Chemistry; published by Gihodo Shuppan Co., Ltd.; pages 143-150), esterification by a dehydration reaction was performed using 4-hydroxybenzoic acid manufactured by Tokyo Chemical Industry Co., Ltd. and 1-butanol manufactured by Tokyo Chemical Industry Co., Ltd. to obtain butyl p-hydroxybenzoate (End Terminator 1).

Production Example 2 p-hydroxybenzoic acid 2-ethylhexyl ester (End Terminator 2) was obtained in a manner similar to that in Production Example 1, except that 1-butanol was changed to 2-ethylhexanol manufactured by Mitsubishi Chemical Corporation.

Production Example 3 p-hydroxybenzoic acid hexadecyl ester (End Terminator 3) was obtained in a manner similar to that in Production Example 1, except that 1-butanol was changed to 1-hexadecanol manufactured by Tokyo Chemical Industry Co., Ltd.

Production Example 4 p-hydroxybenzoic acid docosyl ester (End Terminator 4) was obtained in a manner similar to that in Production Example 1, except that 1-butanol was changed to 1-docosanol manufactured by Tokyo Chemical Industry Co., Ltd.

Production Example 5 p-hydroxybenzoic acid tetracosyl ester (End Terminator 5) was obtained in a manner similar to that in Production Example 1, except that 1-butanol was changed to 1-tetracosanol manufactured by Tokyo Chemical Industry Co., Ltd.

[Production of Injection-Molded Body for Vehicles Containing Polycarbonate Resin]

Example 1

7.1 kg (31.14 mol) of bisphenol A (BPA) manufactured by Nippon Steel & Sumikin Chemical Co., Ltd. and 30 g of hydrosulfite were added to and dissolved in 57.2 kg of 9% (w/w) aqueous solution of sodium hydroxide. 40 kg of dichloromethane was added thereto, and 4.33 kg of phosgene was blown into the solution over 30 minutes while stirring with the solution temperature being held at 15° C. to 25° C.

After blowing of phosgene was completed, 6 kg of 9% (w/w) aqueous solution of sodium hydroxide, 11 kg of dichloromethane, and a solution obtained by dissolving 291 g (1.16 mol) of the aforementioned End Terminator 2 in 10 kg of dichloromethane were added thereto, and the mixture was vigorously stirred to be emulsified. After that, 10 ml of triethylamine as a polymerization catalyst was added thereto to perform polymerization for about 40 minutes.

The polymerization solution was separated into an aqueous phase and an organic phase, and the organic phase was neutralized with phosphoric acid and repeatedly washed with pure water until pH of the washing solution became neutral. The organic solvent was distilled away from the purified polycarbonate resin solution, thereby obtaining polycarbonate resin powder.

The obtained polycarbonate resin powder was melt-kneaded by a single screw extruder with a vent having a screw diameter of 40 mm ("VS-40" manufactured by Tanabe Plastics Machinery Co., Ltd.) at a cylinder temperature of 260° C. and subjected to strand cut, thereby obtaining a pellet.

Using the obtained polycarbonate resin pellet, the viscosity-average molecular weight, the glass transition temperature and the Q value were measured. The viscosity-average molecular weight was 24,000, the glass transition temperature (Tg) was 138° C., and the Q value was $10 \times 10^{-2}$ cc/sec.

The obtained pellet was dried by a hot air circulation type dryer at 100° C. for 5 to 7 hours. After that, a test piece for the Izod impact test was molded by an injection molding machine ("C-Mobile" manufactured by Shinko Sellbic Co., Ltd.) at a resin temperature of 300° C. and at a mold temperature of 80° C., and the notched Izod impact test was carried out according to ASTM D256.

The Izod impact strength was measured, and it was 700 J/m.

In addition, using the dried pellet obtained, and using the injection molding machine ("HSP100A" manufactured by Sodick Co., Ltd.), a light guide-type test piece (3 mm×3 mm×300 mm) was molded at a resin temperature of 340° C. and at a mold temperature of 105° C., and during this, the moldability was confirmed based on the presence or absence of filling insufficiency and occurring of deformation/cracking of a molded product. The case where molding was carried out without any problem and the moldability was good was represented by "O", and the case where a problem occurred and the moldability was poor was represented by "X".

The moldability was confirmed and it was good.

Example 2

Polycarbonate resin powder was obtained in a manner similar to that in Example 1, except that the amount of End Terminator 2 was changed to 503 g (2.01 mol).

Regarding the obtained polycarbonate resin, the viscosity-average molecular weight was 20,000, the glass transition temperature (Tg) was 130° C., the Q value was $21 \times 10^{-2}$ cc/sec, the Izod impact strength was 650 J/m, and the moldability was good.

Example 3

Polycarbonate resin powder was obtained in a manner similar to that in Example 1, except that the amount of End Terminator 2 was changed to 628 g (2.51 mol).

Regarding the obtained polycarbonate resin, the viscosity-average molecular weight was 18,000, the glass transition temperature (Tg) was 125° C., the Q value was $44 \times 10^{-2}$ cc/sec, the Izod impact strength was 450 J/m, and the moldability was good.

Example 4

Polycarbonate resin powder was obtained in a manner similar to that in Example 1, except that 291 g (1.16 mol) of End Terminator 2 was changed to 664 g (1.83 mol) of End Terminator 3.

Regarding the obtained polycarbonate resin, the viscosity-average molecular weight was 24,000, the glass transition temperature (Tg) was 126° C., the Q value was $12 \times 10^{-2}$ cc/sec, the Izod impact strength was 700 J/m, and the moldability was good.

Example 5

Polycarbonate resin powder was obtained in a manner similar to that in Example 1, except that 291 g (1.16 mol) of End Terminator 2 was changed to 730 g (2.01 mol) of End Terminator 3.

Regarding the obtained polycarbonate resin, the viscosity-average molecular weight was 20,000, the glass transition temperature (Tg) was 119° C., the Q value was $37 \times 10^{-2}$ cc/sec, the Izod impact strength was 530 J/m, and the moldability was good.

Example 6

Polycarbonate resin powder was obtained in a manner similar to that in Example 1, except that 291 g (1.16 mol) of End Terminator 2 was changed to 897 g (2.47 mol) of End Terminator 3.

Regarding the obtained polycarbonate resin, the viscosity-average molecular weight was 18,000, the glass transition temperature (Tg) was 115° C., the Q value was $69 \times 10^{-2}$ cc/sec, the Izod impact strength was 350 J/m, and the moldability was good.

Example 7

Polycarbonate resin powder was obtained in a manner similar to that in Example 1, except that 291 g (1.16 mol) of End Terminator 2 was changed to 1119 g (2.51 mol) of End Terminator 4.

Regarding the obtained polycarbonate resin, the viscosity-average molecular weight was 24,000, the glass transition temperature (Tg) was 120° C., the Q value was $18 \times 10^{-2}$ cc/sec, the Izod impact strength was 700 J/m, and the moldability was good.

Example 8

Polycarbonate resin powder was obtained in a manner similar to that in Example 1, except that 291 g (1.16 mol) of End Terminator 2 was changed to 1267 g (2.84 mol) of End Terminator 4.

Regarding the obtained polycarbonate resin, the viscosity-average molecular weight was 22,000, the glass transition temperature (Tg) was 117° C., the Q value was $22 \times 10^{-2}$ cc/sec, the Izod impact strength was 650 J/m, and the moldability was good.

Example 9

Polycarbonate resin powder was obtained in a manner similar to that in Example 1, except that 291 g (1.16 mol) of End Terminator 2 was changed to 1565 g (3.51 mol) of End Terminator 4.

Regarding the obtained polycarbonate resin, the viscosity-average molecular weight was 18,000, the glass transition temperature (Tg) was 110° C., the Q value was 41×10$^{-2}$ cc/sec, the Izod impact strength was 300 J/m, and the moldability was good.

Comparative Example 1

Polycarbonate resin powder was obtained in a manner similar to that in Example 1, except that 291 g (1.16 mol) of End Terminator 2 was changed to 155 g (0.80 mol) of End Terminator 1.

Regarding the obtained polycarbonate resin, the viscosity-average molecular weight was 24,000, the glass transition temperature (Tg) was 139° C., the Q value was 5×10$^{-2}$ cc/sec, the Izod impact strength was 700 J/m, and the moldability was poor.

Comparative Example 2

Polycarbonate resin powder was obtained in a manner similar to that in Example 1, except that the amount of phenol 2 was changed to 443 g (1.77 mol).

Regarding the obtained polycarbonate resin, the viscosity-average molecular weight was 26,000, the glass transition temperature (Tg) was 139° C., the Q value was 3×10$^{-2}$ cc/sec, the Izod impact strength was 750 J/m, and the moldability was poor.

Comparative Example 3

Polycarbonate resin powder was obtained in a manner similar to that in Example 1, except that the amount of phenol 2 was changed to 643 g (2.57 mol).

Regarding the obtained polycarbonate resin, the viscosity-average molecular weight was 16,500, the glass transition temperature (Tg) was 120° C., the Q value was 67×10$^{-2}$ cc/sec, the Izod impact strength was 190 J/m, and the moldability was poor.

Comparative Example 4

Polycarbonate resin powder was obtained in a manner similar to that in Example 1, except that 291 g (1.16 mol) of End Terminator 2 was changed to 632 g (1.74 mol) of End Terminator 3.

Regarding the obtained polycarbonate resin, the viscosity-average molecular weight was 26,000, the glass transition temperature (Tg) was 126° C., the Q value was 7×10$^{-2}$ cc/sec, the Izod impact strength was 750 J/m, and the moldability was poor.

Comparative Example 5

Polycarbonate resin powder was obtained in a manner similar to that in Example 1, except that 291 g (1.16 mol) of End Terminator 2 was changed to 1143 g (3.14 mol) of End Terminator 3.

Regarding the obtained polycarbonate resin, the viscosity-average molecular weight was 15,000, the glass transition temperature (Tg) was 104° C., the Q value was 80×10$^{-2}$ cc/sec, the Izod impact strength was 180 J/m, and the moldability was poor.

Comparative Example 6

Polycarbonate resin powder was obtained in a manner similar to that in Example 1, except that 291 g (1.16 mol) of End Terminator 2 was changed to 834 g (1.87 mol) of End Terminator 4.

Regarding the obtained polycarbonate resin, the viscosity-average molecular weight was 34,000, the glass transition temperature (Tg) was 128° C., the Q value was 2×10$^{-2}$ cc/sec, the Izod impact strength was 800 J/m, and the moldability was poor.

Comparative Example 7

Polycarbonate resin powder was obtained in a manner similar to that in Example 1, except that 291 g (1.16 mol) of End Terminator 2 was changed to 1717 g (3.85 mol) of End Terminator 4.

Regarding the obtained polycarbonate resin, the viscosity-average molecular weight was 16,000, the glass transition temperature (Tg) was 101° C., the Q value was 78×10$^{-2}$ cc/sec, the Izod impact strength was 190 J/m, and the moldability was poor.

Comparative Example 8

Polycarbonate resin powder was obtained in a manner similar to that in Example 1, except that 291 g (1.16 mol) of End Terminator 2 was changed to 1506 g (3.18 mol) of End Terminator 5.

Regarding the obtained polycarbonate resin, the viscosity-average molecular weight was 20,000, the glass transition temperature (Tg) was 104° C., the Q value was 40×10$^{-2}$ cc/sec, the Izod impact strength was 500 J/m, and the moldability was poor.

Table 1

TABLE 1

| | Dihydric phenol | End Terminator | Mv | Q value ($10^{-2}$ cc/sec) | Izod impact strength (J/m) | Glass transition temperature (° C.) | Moldability |
|---|---|---|---|---|---|---|---|
| Example 1 | BPA | End Terminator 2 | 24,000 | 10 | 700 | 138 | ○ |
| Example 2 | BPA | End Terminator 2 | 20,000 | 21 | 650 | 130 | ○ |
| Example 3 | BPA | End Terminator 2 | 18,000 | 44 | 450 | 125 | ○ |
| Example 4 | BPA | End Terminator 3 | 24,000 | 12 | 700 | 126 | ○ |
| Example 5 | BPA | End Terminator 3 | 20,000 | 37 | 530 | 119 | ○ |
| Example 6 | BPA | End Terminator 3 | 18,000 | 69 | 350 | 115 | ○ |
| Example 7 | BPA | End Terminator 4 | 24,000 | 18 | 700 | 120 | ○ |
| Example 8 | BPA | End Terminator 4 | 22,000 | 22 | 650 | 117 | ○ |
| Example 9 | BPA | End Terminator 4 | 18,000 | 41 | 300 | 110 | ○ |
| Comparative Example 1 | BPA | End Terminator 1 | 24,000 | 5 | 700 | 139 | X |
| Comparative Example 2 | BPA | End Terminator 2 | 26,000 | 3 | 750 | 139 | X |

TABLE 1-continued

| | Dihydric phenol | End Terminator | Mv | Q value ($10^{-2}$ cc/sec) | Izod impact strength (J/m) | Glass transition temperature (° C.) | Moldability |
|---|---|---|---|---|---|---|---|
| Comparative Example 3 | BPA | End Terminator 2 | 16,500 | 67 | 190 | 120 | X |
| Comparative Example 4 | BPA | End Terminator 3 | 26,000 | 7 | 750 | 126 | X |
| Comparative Example 5 | BPA | End Terminator 3 | 15,000 | 80 | 180 | 104 | X |
| Comparative Example 6 | BPA | End Terminator 4 | 34,000 | 2 | 800 | 128 | X |
| Comparative Example 7 | BPA | End Terminator 4 | 16,000 | 78 | 190 | 101 | X |
| Comparative Example 8 | BPA | End Terminator 5 | 20,000 | 40 | 500 | 104 | X |

As described above, when a polycarbonate resin having excellent flowability and impact strength was contained, an injection-molded body for vehicles having good heat resistance and impact resistance was successfully provided.

INDUSTRIAL APPLICABILITY

The molded body containing the polycarbonate resin of the present invention has high resin flowability and can be suitably utilized as an injection-molded body for vehicles which requires heat resistance and impact resistance, and therefore has very high industrial applicability.

The present invention also includes the below-described embodiments.

<1> An injection-molded body for vehicles, comprising a polycarbonate resin obtained by reacting a monohydric phenol represented by general formula (1a) below as an end terminator.

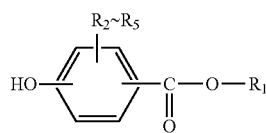

(1a)

(In the formula: $R_1$ represents an alkyl group having 5 to 23 carbon atoms or an alkenyl group having 8 to 36 carbon atoms; and $R_2$ to $R_5$ each independently represent any one selected from the group consisting of hydrogen, halogen, an alkyl group having 1 to 20 carbon atoms which may have a substituent and an aryl group having 6 to 12 carbon atoms which may have a substituent.)

<2> The molded body according to item <1>, wherein the polycarbonate resin comprises a structural unit represented by general formula (2) below.

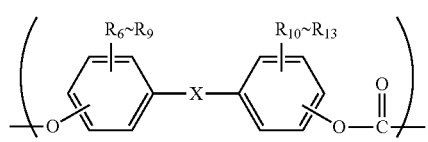

(2)

(In the formula: $R_6$ to $R_{13}$ each independently represent any one selected from the group consisting of hydrogen, halogen, an alkoxyl group having 1 to 5 carbon atoms which may have a substituent, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent and an alkenyl group having 2 to 15 carbon atoms which may have a substituent; and X represents any structure selected from the group consisting of a single bond, —O—, —S—, —SO—, —SO$_2$—, —CO— and general formulae (3) to (6) below.)

(3)

(In the formula: $R_{14}$ and $R_{15}$ each independently represent any one selected from the group consisting of hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an alkenyl group having 2 to 5 carbon atoms which may have a substituent and an aralkyl group having 7 to 17 carbon atoms which may have a substituent; and c represents an integer of 1 to 20.)

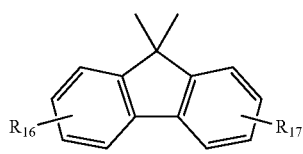

(4)

(In the formula, $R_{16}$ and $R_{17}$ each independently represent any one selected from the group consisting of hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an alkenyl group having 2 to 5 carbon atoms which may have a substituent and an aralkyl group having 7 to 17 carbon atoms which may have a substituent, and $R_{16}$ and $R_{17}$ may be bonded together to form a carbocyclic ring or heterocyclic ring having 1 to 20 carbon atoms.)

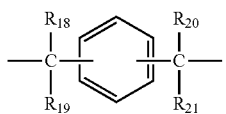
(5)

(In the formula, $R_{18}$ to $R_{21}$ each independently represent any one selected from the group consisting of hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an alkenyl group having 2 to 5 carbon atoms which may have a substituent and an aralkyl group having 7 to 17 carbon atoms which may have a substituent, and $R_{18}$ and $R_{19}$, and $R_{20}$ and $R_{21}$, respectively, may be bonded together to form a carbocyclic ring or heterocyclic ring having 1 to 20 carbon atoms.)

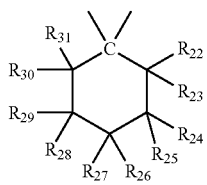
(6)

(In the formula, $R_{22}$ to $R_{31}$ each independently represent a hydrogen atom or an alkyl group having 1 to 3 carbon atoms.)

<3> The molded body according to item <1> or <2>, wherein the polycarbonate resin has a viscosity-average molecular weight of 18,000 to 24,000.

<4> The molded body according to any one of items <1> to <3>, wherein the monohydric phenol is represented by general formula (8a) below.

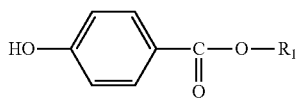
(8a)

(In the formula, $R_1$ represents an alkyl group having 5 to 23 carbon atoms.)

<5> The molded body according to item <4>, wherein $R_1$ in general formula (8a) is at least one selected from the group consisting of a 2-ethylhexyl group, a hexadecyl group and a docosyl group.

<6> The molded body according to any one of items <2> to <5>, wherein X in the aforementioned general formula (2) is the aforementioned general formula (3).

<7> The molded body according to any one of items <1> to <6>, wherein the polycarbonate resin has a Q value of $10 \times 10^{-2}$ cc/sec or more.

<8> The molded body according to any one of items <1> to <7>, wherein the polycarbonate resin has an Izod impact strength of 200 J/m or more.

<9> The molded body according to any one of items <1> to <8>, wherein the polycarbonate resin has a glass transition temperature of 105° C. or higher.

<10> An automobile light guide, which comprises the molded body according to any one of items <1> to <9> as a member.

<12> An automobile interior panel, which comprises the molded body according to any one of items <1> to <9> as a member.

<13> An automobile lamp lens, which comprises the molded body according to any one of items <1> to <9> as a member.

The invention claimed is:

1. An injection-molded body for vehicles, comprising a polycarbonate resin having a terminal structure represented by formula (1) and having a viscosity-average molecular weight of 18,000 to 24,000:

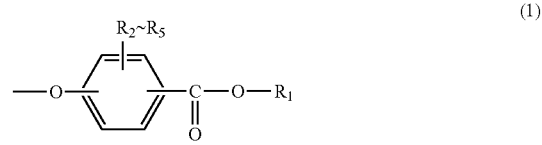
(1)

wherein:
$R_1$ is at least one selected from the group consisting of a 2-ethylhexyl group, a 2-hexyldecyl group, a hexadecyl group, and a docosyl group; and
$R_2$ to $R_5$ each independently represent any one selected from the group consisting of hydrogen, halogen, an alkyl group having 1 to 20 carbon atoms which may have a substituent and an aryl group having 6 to 12 carbon atoms which may have a substituent.

2. The molded body according to claim 1, wherein the polycarbonate resin comprises a structural unit represented by formula (2):

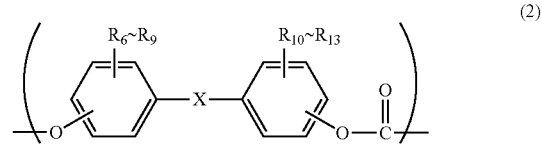
(2)

wherein:
$R_6$ to $R_{13}$ each independently represents any one selected from the group consisting of hydrogen, halogen, an alkoxyl group having 1 to 5 carbon atoms which may have a substituent, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent and an alkenyl group having 2 to 15 carbon atoms which may have a substituent; and
X represents any structure selected from the group consisting of a single bond, —O—, —S—, —SO—, —SO$_2$—, —CO—, and general formulae (3) to (6) below:

(3)

wherein:

R$_{14}$ and R$_{15}$ each independently represents any one selected from the group consisting of hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an alkenyl group having 2 to 5 carbon atoms which may have a substituent and an aralkyl group having 7 to 17 carbon atoms which may have a substituent; and c represents an integer of 1 to 20,

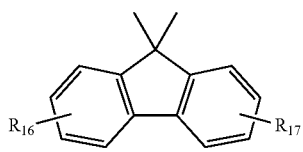

(4)

wherein R$_{16}$ and R$_{17}$ each independently represents any one selected from the group consisting of hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an alkenyl group having 2 to 5 carbon atoms which may have a substituent and an aralkyl group having 7 to 17 carbon atoms which may have a substituent, and R$_{16}$ and R$_{17}$ may be bonded together to form a carbocyclic ring or heterocyclic ring having 1 to 20 carbon atoms,

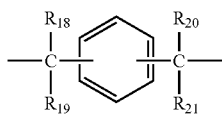

(5)

wherein R$_{18}$ to R$_{21}$ each independently represents any one selected from the group consisting of hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an alkenyl group having 2 to 5 carbon atoms which may have a substituent and an aralkyl group having 7 to 17 carbon atoms which may have a substituent, and R$_{18}$ and R$_{19}$, and R$_{20}$ and R$_{21}$, respectively, may be bonded together to form a carbocyclic ring or heterocyclic ring having 1 to 20 carbon atoms,

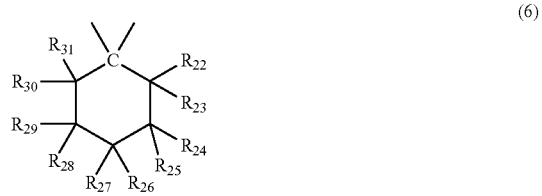

(6)

wherein R$_{22}$ to R$_{31}$ each independently represents a hydrogen atom or an alkyl group having 1 to 3 carbon atoms.

3. The molded body according to claim 1, wherein the terminal structure has a structure represented by formula (8):

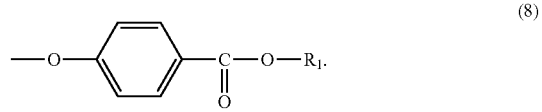

(8)

4. The molded body according to claim 2, wherein X in formula (2) has a structure of formula (3).

5. The molded body according to claim 1, wherein the polycarbonate resin has a Q value of $10 \times 10^{-2}$ cc/sec or more.

6. The molded body according to claim 1, wherein the polycarbonate resin has an Izod impact strength of 200 J/m or more.

7. The molded body according to claim 1, wherein the polycarbonate resin has a glass transition temperature of 105° C. or higher.

8. An automobile light guide, which comprises the molded body according to claim 1 as a member.

9. An automobile interior panel, which comprises the molded body according to claim 1 as a member.

10. An automobile lamp lens, which comprises the molded body according to claim 1 as a member.

* * * * *